UNITED STATES PATENT OFFICE.

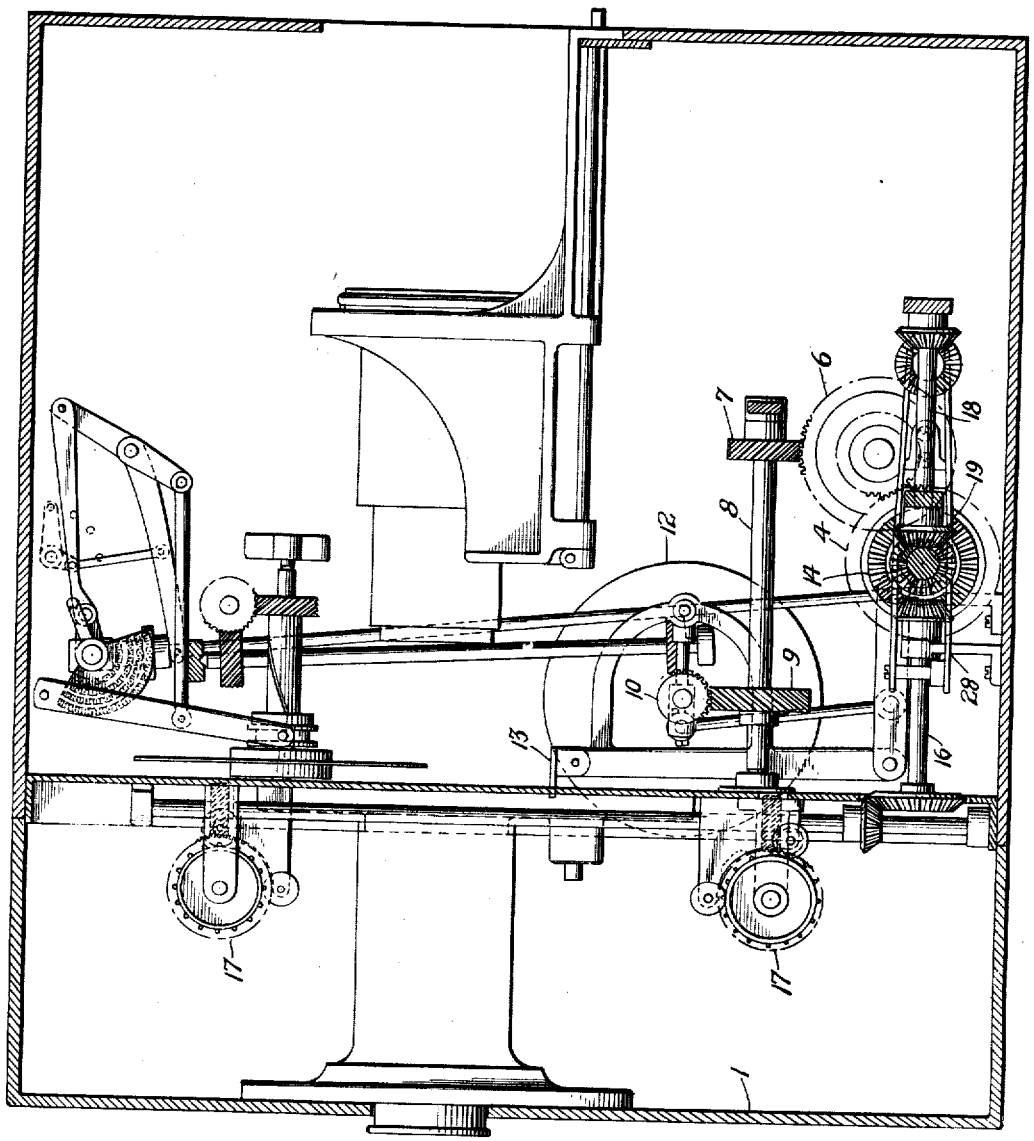

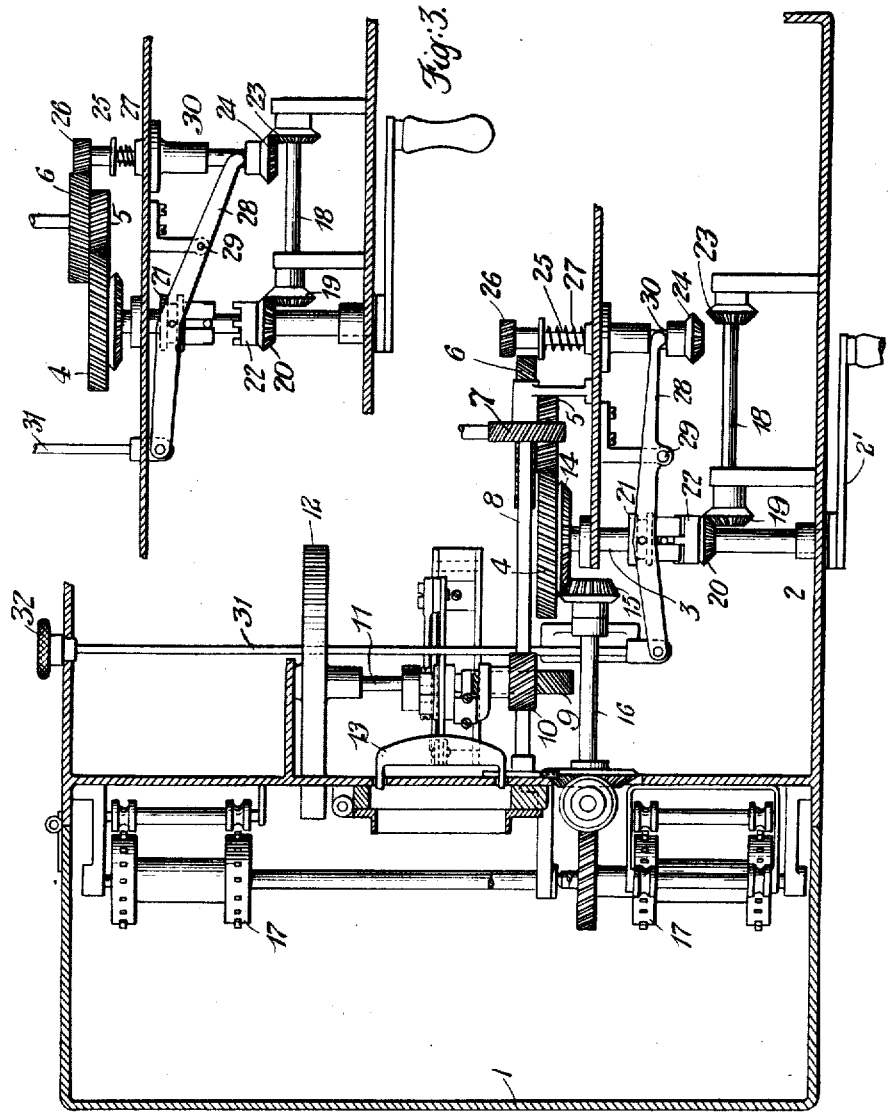

GEORGE R. STRINGHAM, OF NEW YORK, N. Y., ASSIGNOR TO THEO. B. LYON, OF MAMARONECK, NEW YORK, AND W. WALLACE LYON, OF WHITE PLAINS, NEW YORK, TRUSTEES.

MOTION-PICTURE CAMERA.

1,334,057.          Specification of Letters Patent.          Patented Mar. 16, 1920.

Application filed December 12, 1917. Serial No. 206,765.

*To all whom it may concern:*

Be it known that I, GEORGE R. STRINGHAM, a citizen of the United States, and a resident of the borough of Manhattan, city, county, and State of New York, and having a post-office address at No. 512 West 132nd street, New York, have invented certain new and useful Improvements in Motion - Picture Cameras, of which the following is a specification.

My invention relates to various new and useful improvements in motion picture cameras, and particularly to improved mechanism for actuating the film feeding devices. In the operation of a motion picture camera it is desirable that mechanism shall be provided of substantial and sturdy construction by which the film feeding devices may be actuated positively at the normal high rate of speed, without lost motion, and as silently as possible. Ordinarily this speed is 16 per second. In the operation of a motion picture camera for so-called "stop work," it is necessary to feed the film forward two or three pictures, then to stop the camera, readjust the objects that are being photographed, start up again for two or three more pictures and so on. With ordinary cameras having provision for a single feeding movement, the doing of stop-work in this way is a very unsatisfactory operation, because the gear ratio is so high with respect to the operating crank that it is difficult to secure only two or three feeding movements of the film and there is also danger of the camera being displaced by the pressure which has to be imposed on the operating handle and thus the successive pictures fail to register.

It has been proposed to make motion picture cameras with a second gear ratio designed for stop work, but the mechanical arrangements by which the ordinary driving mechanism is discontinued and the low ratio driving mechanism substituted have been objectionably complicated and tedious of adjustment. With my improved driving mechanism I provide devices whereby a simple adjustment of a finger piece permits the normal driving mechanism to be discontinued and the low ratio driving mechanism automatically introduced connecting the crank handle with the film feeding devices. Preferably I arrange the normal feed mechanism so that the normal ratio shall be 8 to 1, that is to say, there will be two turns of the crank handle per second and the low speed ratio shall be 1 to 1, so that a single turn of the crank handle will effect a single feed movement of the film feeding devices.

In order that the invention may be better understood, attention is directed to the accompanying drawings forming part of this specification, and in which—

Figure 1 is a vertical sectional view of a motion picture camera equipped with my improved driving mechanism in its preferred form, Fig. 2, a horizontal sectional view with the high speed or normal driving mechanism in operation, and Fig. 3, detail horizontal section showing the driving mechanism with the low speed gears in mesh.

In all of the above views corresponding parts are represented by the same numerals of reference.

The camera case 1 is generally rectangular being provided with film boxes arranged side by side (not shown) and with the lens tube (not shown) arranged between the film boxes. In the lower part of the camera case is a shaft 2 to which the ordinary handle 2' is removably connected in the usual way. The shaft 2 drives a stub shaft 3 which carries a gear 4, preferably a spiral gear, meshing with and driving a smaller spiral gear 5 carrying on its shaft a larger spiral gear 6. From this spiral gear 6 I drive the film feeding devices by means of a spiral gear 7 on a shaft 8, the other end of which carries a spiral gear 9, which in turn meshes with a spiral gear 10 on the claw crank shaft 11. I preferably use spiral gears as explained, because I find in actual practice that these provide a very positive and direct drive, free from any lost motion and giving practically a silent operation, but obviously other mechanical devices may be substituted if desired. The shaft 11 carries a fly wheel 12 giving steadiness to the operation. The claw 13 which feeds the film is actuated from the shaft 11 in any suitable way, the purpose of the claw being to engage two of the perforations in the film, which is then drawn downward to the extent of one picture, after which the claw is withdrawn and elevated to again engage the film when a new feed movement is to take place.

The shaft 3 carries a bevel gear 14 which drives a pinion 15 on the shaft 16 and through the gearing shown actuates continuously the sprockets 17, 17 for moving the film continuously out of one of the film boxes and directing the film continuously into the other film box. Mounted in bearings on the camera casing is a shaft 18 carrying a beveled gear 19 which meshes with and is driven by a beveled gear 20 on the crank handle shaft 2. These gears are always in mesh. A clutch sleeve 21 is mounted upon the stub shaft 3 so as to turn therewith, but is capable of longitudinal movement with respect to the same. When the mechanism is in its normal condition driving the film at high speed, the clutch sleeve 21 engages a clutch member 22 carried by the beveled gear 20, so that the crank handle will rotate the main shaft 2 and stub shaft 3 directly, and the counter shaft 18 will turn idly. The counter-shaft 18 is provided with a beveled gear 23 thereon with which a gear 24 is adapted to engage when the low speed ratio is to be utilized. The gear 24 is carried on a shaft 25, the inner end of which carries a spiral gear 26 normally out of mesh with the gear 6. When the shaft 25 is moved longitudinally against the tension of the spring 27, the gears 23 and 24 will be brought into mesh and the gear 26 will be brought into mesh with the gear 6. This movement of the shaft 25 is effected by means of a lever 28 pivoted at 29 and having a forked end 30 engaging underneath the boss or collar of the bevel gear 24. The lever 28 straddles the clutch member 21 and is pivoted thereto so that when said lever is swung on its pivot it will simultaneously engage the gears 23 and 24 and disengage the clutch members 21 and 22, thus disconnecting the crank shaft 2 from the stub shaft 3. This lever 28 may be operated in any suitable way, such as by a rod 31, the outer end of which is provided with a button 32 on the outside of the camera casing. The lever 28 may be locked in its secondary position, i. e., when the low ratio gears are in mesh in any suitable way. A convenient arrangement is to simply pull out the button 32 and move it slightly to one side so that its inner edge will engage with the outside of the camera casing.

In operation when the parts are in the normal position shown in Fig. 2, the turning of the crank handle directly rotates the main shaft 2 and stub shaft 3 and through the gears 4, 5, 6, 7, 9, and 10 operates the claw crank shaft 11, which in turn actuates the feeding claw at the desired speed of 16 per second. When it is necessary to use the camera for stop work, making a low speed ratio desirable, the lever 28 is swung pivotally, disconnecting the clutch members 21 and 22 so as to permit the crank handle to turn independently of the stub shaft 3. This movement also brings the gears 23 and 24, and 26 and 6 into mesh, as explained, so that the feeding mechanism will then be actuated at a very slow speed through the gears 19 and 20, 23 and 24, and 26 and 6, as it will be understood.

Having now described my invention, what I claim as new therein and desire to secure by Letters Patent is as follows:—

1. In a motion picture camera, the combination of mechanism for feeding the film intermittently, a driving shaft, a main gear connected to and driving the film feeding mechanism, a clutch connecting the driving shaft and the said gear by which the gear will be driven directly, a speed reducing gearing between the main shaft and said gear adapted to be automatically brought into operation when said clutch is disengaged to disconnect said gear from the driving shaft, substantially as set forth.

2. In a motion picture camera, the combination of mechanism for feeding the film intermittently, a main gear connected with and driving said mechanism, a main shaft, a clutch between the main shaft and gear whereby the gear will be driven directly from the main shaft, a sliding pinion adapted to mesh with said gear and connections between said pinion and shaft, substantially as set forth.

3. In a motion picture camera, the combination of mechanism for feeding the film intermittently, a main gear connected with and driving said mechanism, a main shaft, a clutch between said gear and shaft by which the gear is driven directly, a pinion normally out of mesh with said gear, connections between said pinion and the main shaft and means for simultaneously disengaging said clutch and engaging the said pinion with said gear, substantially as set forth.

4. In a motion picture camera, the combination of mechanism for feeding the film intermittently, a main gear connected with and driving said mechanism, a main shaft, a clutch between the main shaft and gear whereby the gear will be driven directly, a longitudinally movable pinion adapted to be engaged with or disengaged from said gear, connections between said pinion and the main shaft, and means for simultaneously disengaging said clutch and moving the pinion longitudinally into engagement with the gear, substantially as set forth.

5. In a motion picture camera, the combination of mechanism for feeding the film intermittently, a main gear connected with and driving said mechanism, a main shaft, a clutch between the main shaft and gear whereby the gear will be driven directly, a longitudinally movable pinion adapted to be engaged with or disengaged from said gear, connections between said pinion and the main shaft, means for simultaneously disengaging said clutch and moving the pinion longitudinally into engagement with the gear, and a spring for normally holding the pinion out of engagement with the gear, substantially as set forth.

6. In a motion picture camera, a two speed operating mechanism therefor, comprising in combination a main driving gear, a shaft adapted to be directly connected thereto or disconnected therefrom, and low speed gearing between said shaft and driving gear normally disconnected from but adapted to be connected to the driving gear when the shaft is directly disconnected therefrom, substantially as set forth.

7. In a motion picture camera, a two speed driving mechanism therefor, comprising in combination a main driving gear, a main shaft, a clutch between said gear and shaft and low speed gearing normally disconnected from the driving gear, but adapted to be automatically connected therewith when said clutch is disconnected, substantially as set forth.

8. In a motion picture camera, a two speed driving mechanism therefor, comprising in combination a main driving gear, a main shaft, a clutch between the driving gear and main shaft, a lever for operating said clutch, and low speed gearing adapted to be connected to the driving gear and shaft and adapted to be brought into operative relationship by means of said lever, substantially as set forth.

9. In a motion picture camera, a two speed driving mechanism therefor, comprising in combination a main driving gear, a main shaft, a clutch normally connecting the driving gear and shaft, a pinion normally out of mesh with the driving gear but adapted to be moved longitudinally to engage therewith, connections between the pinion and said shaft and a single lever for simultaneously moving said clutch and pinion whereby when the clutch is disengaged the pinion will be automatically brought into mesh with the main gear, substantially as set forth.

10. In a motion picture camera, a two speed driving mechanism therefor, comprising in combination a main driving gear, a main shaft, a clutch normally connecting the driving gear and shaft, a pinion normally out of mesh with the driving gear but adapted to be moved longitudinally to engage therewith, connections between the pinion and said shaft, a single lever for simultaneously moving said clutch and pinion whereby when the clutch is disengaged the pinion will be automatically brought into mesh with the main gear, and a spring normally holding the pinion out of mesh with said gear, substantially as set forth.

This specification signed and witnessed this 30th day of October, 1917.

GEORGE R. STRINGHAM.

Witnesses:
A. E. RENTON,
JOSEPHINE G. MCDERMOTT.